(12) United States Patent
Kim et al.

(10) Patent No.: US 10,315,578 B2
(45) Date of Patent: Jun. 11, 2019

(54) MODULAR MIRROR ASSEMBLY

(71) Applicant: Faraday&Future Inc., Gardena, CA (US)

(72) Inventors: Richard S. Kim, Los Angeles, CA (US); Hong S. Bae, Torrance, CA (US); Skyler R. Lund, La Crescenta, CA (US); Brian Sung Oh, Granada Hills, CA (US); Page Brullau Beermann, Marina del Rey, CA (US); Charles Edward Spencer, Long Beach, CA (US); Zu-Ning Chen, Long Beach, CA (US); Christopher W. Lamorte, Anaheim, CA (US); Calvin Liu, Torrance, CA (US); Padmanabhan Kumar, Fremont, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 0 days.

(21) Appl. No.: 15/482,635

(22) Filed: Apr. 7, 2017

(65) Prior Publication Data

US 2017/0210297 A1    Jul. 27, 2017

Related U.S. Application Data

(66) Continuation-in-part of application No. PCT/US2017/013566, filed on Jan. 13, 2017, (Continued)

(51) Int. Cl.
*B60R 1/12* (2006.01)
*G01S 17/93* (2006.01)
(Continued)

(52) U.S. Cl.
CPC ............... *B60R 1/12* (2013.01); *B60R 1/072* (2013.01); *B60R 1/074* (2013.01); *B60R 11/04* (2013.01);
(Continued)

(58) Field of Classification Search
CPC .......... B60R 1/12; B60R 1/072; B60R 1/074; B60R 11/04; B60R 2001/1223;
(Continued)

(56) References Cited

U.S. PATENT DOCUMENTS 4,699,024 A * 10/1987 Iida .................... B60R 1/074
                                                        359/841
4,893,916 A *  1/1990 Sakuma ............... B60R 1/074
                                                        248/478
(Continued)

FOREIGN PATENT DOCUMENTS

WO    WO 2017124038 A1 *  7/2017  ............... B60R 1/06

*Primary Examiner* — Frank G Font
(74) *Attorney, Agent, or Firm* — Morrison & Foerster LLP

(57) ABSTRACT

A vehicle modular side view mirror assembly is disclosed. The mirror base has a first section capable of attachment to a vehicle and a second section capable of attachment to a mirror head, wherein the second section is movable relative to the first section. The mirror assembly can include a mirror head having a reflective surface and a motor for moving the mirror head relative to a mirror base, the mirror head detachably connectable to the mirror base. Lidar sensors can be mounted in addition to, or in place of, the side view mirrors. Interchangeable modular heads can allow a user to customize the vehicle to have mirror heads, sensors, both, or neither. Mirror bases can move, allowing the mirrors and/or sensors to be positioned at different angles. In some con-
(Continued)

figurations, the position of the sensors can be dynamically adjusted according to the speed and/or direction of the vehicle.

5 Claims, 13 Drawing Sheets

Related U.S. Application Data

Substitute for application No. 62/278,699, filed on Jan. 14, 2016.

(60) Provisional application No. 62/278,708, filed on Jan. 14, 2016, provisional application No. 62/365,945, filed on Jul. 22, 2016, provisional application No. 62/319,645, filed on Apr. 7, 2016.

(51) Int. Cl.
*B60R 11/04* (2006.01)
*B60R 1/074* (2006.01)
*B60R 1/072* (2006.01)
*B60R 11/00* (2006.01)

(52) U.S. Cl.
CPC ..... *G01S 17/936* (2013.01); *B60R 2001/1223* (2013.01); *B60R 2001/1253* (2013.01); *B60R 2011/0085* (2013.01); *B60R 2011/0092* (2013.01)

(58) Field of Classification Search
CPC ..... B60R 2001/1253; B60R 2011/0085; B60R 2011/0092; G01S 17/936
USPC ................. 359/841, 844, 872, 877; 296/1.11
See application file for complete search history.

(56) References Cited

U.S. PATENT DOCUMENTS

| | | | |
|---|---|---|---|
| 5,210,651 A * | 5/1993 | Shibuya | B60R 1/074 248/479 |
| 2010/0220406 A1* | 9/2010 | Cuddihy | B60R 1/025 359/843 |
| 2012/0087026 A1* | 4/2012 | Schuurmans | B60R 1/074 359/841 |
| 2014/0268379 A1 | 9/2014 | Kelly | |
| 2014/0297116 A1* | 10/2014 | Anderson | H02K 5/12 701/37 |
| 2015/0217695 A1* | 8/2015 | Millot | B60R 1/074 359/841 |
| 2016/0291134 A1* | 10/2016 | Droz | G01S 7/4802 |
| 2017/0190335 A1* | 7/2017 | Gillett | B60K 7/0007 |
| 2018/0217242 A1* | 8/2018 | Lombrozo | G01S 7/4813 |

* cited by examiner

MODULAR MIRROR ASSEMBLY

CROSS-REFERENCE TO RELATED APPLICATIONS

The present application is a continuation-in-part and claims the benefit of International Application No. PCT/US2017/013566, filed Jan. 13, 2017, and entitled "Modular Mirror Assembly," which in turn claims the benefit of U.S. Provisional Application No. 62/278,699, filed Jan. 14, 2016, and entitled "Modular Side View Mirror," U.S. Provisional Application No. 62/278,708, filed Jan. 14, 2016, and entitled "Motor in Door Modular Mirror Assembly," and U.S. Provisional Application No. 62/365,945, filed Jul. 22, 2016, and entitled "Motor in Door Modular Mirror Assembly;" and claims the benefit of U.S. Provisional Application No. 62/319,645, filed Apr. 7, 2016, and entitled "Mirror Attachment System." Each of the above-referenced applications is hereby incorporated by reference in its entirety and for all purposes.

FIELD OF THE DISCLOSURE

The disclosure relates generally to a modular side view mirror assembly. In particular, the disclosure relates to mirror mounts that include one or more cameras, powerfold side view mirrors with the motor located in the vehicle door, and distance sensors (e.g., Lidar sensor) mounted in addition to, or in place of, side view mirrors for a vehicle.

BACKGROUND OF THE DISCLOSURE

Current vehicle designs do not allow side view mirrors to be removed from the side view mirror bases, which attach the mirror to the vehicle. Additionally, the motor for powerfold side view mirrors typically is located in the side view mirror head. Locating the motor in mirror head limits mirror design options because the motor assembly is bulky and heavy. Additionally, the weight of the motor assembly strains the mirror base, requiring reinforcement of the mirror assembly.

The use of distance sensors, such as Lidar sensors, can be used to enhance and support autonomous driving in a vehicle. However, it can be difficult to place Lidar sensors that provide full coverage for a vehicle, particularly when the vehicle is travelling at different speeds.

The present disclosure addresses this and other shortcomings in the automotive field.

SUMMARY OF THE DISCLOSURE

The disclosure provides, in part, a vehicle side view mirror assembly including a mirror head having a reflective surface and a motor for moving the mirror head relative to a mirror base, wherein the mirror head is detachably connectable to the mirror base. The vehicle side mirror assembly can include one or more additional features. The mirror base can include an attachment point for securing the mirror head. The mirror base also is configured to attach to a vehicle. The vehicle side mirror assembly can include a removable cap storable inside the mirror head, wherein the cap is configured to cover the attachment point when the mirror head is detached.

The mirror base can include at least one camera (e.g., 1, 2, 3, 4, or more) for imaging the vehicle's surroundings. The at least one camera can be a rearward facing camera, a downward facing camera, or a camera that faces or images in any direction of interest.

In this disclosure, the mirror base moves and carries the mirror head with it, to fold the mirror assembly against the automobile door. The disclosure provides, in part, a vehicle side view mirror assembly including a mirror base. The mirror base has a first section capable of attachment to a vehicle and a second section capable of attachment to a mirror head, wherein the second section is movable relative to the first section. The vehicle side view mirror assembly can include one or more additional features. The vehicle side view mirror assembly can include a mirror head that is detachably connected to the second section of the mirror base at an attachment point on the second section of the mirror base. The vehicle side view mirror assembly can include a motor actuator assembly disposed or partially disposed in the first portion of the mirror base, wherein the motor actuator assembly is configured to move the second portion of the mirror base relative to the first portion of the mirror base. The vehicle side mirror assembly can include a removable cap that is storable inside the mirror head, wherein the cap is configured to cover the attachment point when the mirror head is detached.

In this disclosure, Lidar sensors can be mounted to the side of a vehicle in addition to, or in place of, sideview mirrors. The sensors can be moved (i.e., aimed) based on the speed of the vehicle in order to provide better sensor coverage.

Some examples are directed to a vehicle side view mirror assembly, which can comprise a first motor assembly and a base. The base can comprise a first base section attached to a vehicle and a second base section capable of removable attachment to a plurality of accessories (e.g., a mirror head assembly or a Lidar sensor) at an attachment point. A first motor assembly can be included in the base or within the vehicle itself. The first motor assembly can be configured to move the first section (and by extension, the attached accessory or accessories) to a position relative to the second section based on a speed of the vehicle by rotating the first base section about a first axis. In some configurations, the second base section can include at least one camera for imaging the vehicle's surroundings. In some configurations, the side mirror assembly can further comprise a second motor assembly, which can be configured to rotate the accessory or a portion of the accessory about a second axis. In some configurations, the rotation about the second axis can be based on a steering angle or detected path (detected, for example using GPS data). In some configurations, just the reflective face of the mirror head assembly can be configured to move about the second axis. In some configurations, the first axis can be perpendicular to the second axis

BRIEF DESCRIPTION OF THE DRAWINGS

The figures are not necessarily to scale, and emphasis is generally placed upon illustrative principles. The figures are to be considered illustrative in all aspects and are not intended to limit the disclosure, the scope of which is defined by the claims.

DETAILED DESCRIPTION

Figure 1A:
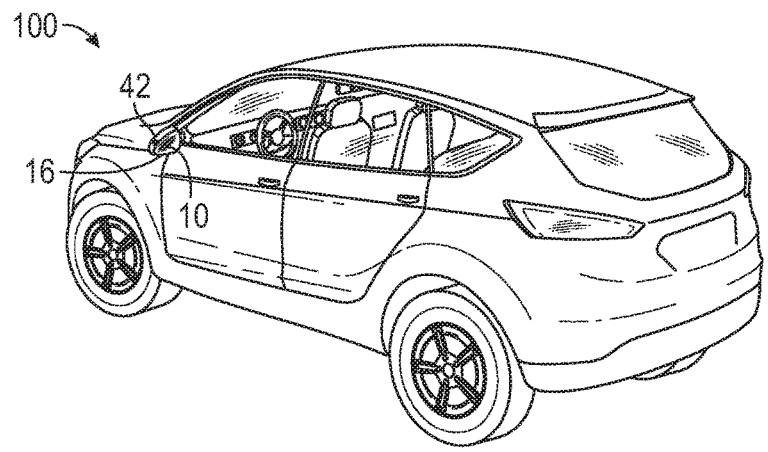
FIG. 1A illustrates a vehicle outfitted with a modular mirror assembly according to examples of the disclosure.

The disclosure provides modular side view mirror head assemblies for vehicles (e.g., automobiles and motorcycles) that enable a side view mirror head to be removed or detached from its mirror head base. The disclosure also provides mirror bases that include one or more cameras (e.g., 1, 2, 3, 4, 5, or more) that can be used to image the vehicle's surroundings. Images from the camera are displayed to the driver or other vehicle occupants on, for example, a screen or heads-up display. Camera images can be used in addition to or instead of the side view mirrors. The removable mirror heads and mirror base cameras can be used together.

The removable mirror head allows a user to customize the vehicle. For example, the modular mirror head can be supplied in different but interchangeable styles. The interchangeable nature of the mirrors also provides a cost-effective way for automobile manufactures to offer many different side view mirror configurations. In addition, the side view mirrors can be removed altogether while still maintaining the ability to view and monitor the vehicle's surroundings during vehicle operation by using the camera(s) mounted on the mirror bases.

This disclosure also provides mirror bases that can move, allowing the mirrors and/or sensors to be positioned at different angles. In some configurations, the position of the sensors can be adjusted according to the speed of the vehicle, for example, to extend the field of view of the sensors further when the vehicle is traveling at high speed. In some configurations, the mirror base (and by extension, the Lidar sensors) can be moved using motor assemblies which are located in the vehicle door and/or mirror base. Locating the motor in the door reduces the mass of the mirror head and also permits more compact mirror head shapes because the motor assembly is relocated to the vehicle door. Reducing the mass of the mirror head, which rests on the end of the mirror base, also reduces strain on the mirror head assembly, thereby requiring less structural reinforcement, more design freedom, and more cost-effective manufacturing.

This disclosure also provides sensors that are mounted in addition to, or in place of, side view mirrors on a vehicle. In some examples, the sensors can include, but are not limited to Lidar. These sensors can be used in an autonomous driving mode, for example, to gather data about the vehicle's surroundings. For example, Lidar sensors can be used to detect objects proximate to the vehicle, or when driver is controlling the vehicle, Lidar can be used to alert the driver of blind spots, activate automatic emergency braking, and/or augment detection of objects in low lighting conditions. In some examples, the sensors can include one or more indicators, such as a light or other visual indicator to alert nearby pedestrians that the vehicle is being operated in an autonomous driving mode.

The figures illustrate a modular mirror assembly in various configurations, which can be installed on a vehicle. For clarity, in some figures, the modular mirror assembly is shown as isolated without the vehicle, however, it should be understood that the modular mirror system described herein can be mounted at any location on the vehicle which is convenient to provide the user of the vehicle with views of the surrounding area of the car.

In the illustrations shown in the figures, the mirror assembly may be installed on a driver's side door. A similar mirror assembly can be supplied on the passenger side of the vehicle. It should be further understood that although the examples described herein refer to a "mirror assembly" and "mirror base" for ease of reference, the assembly need not include a mirror in some configurations, as will be explained in more detail below.

Figure 1B:
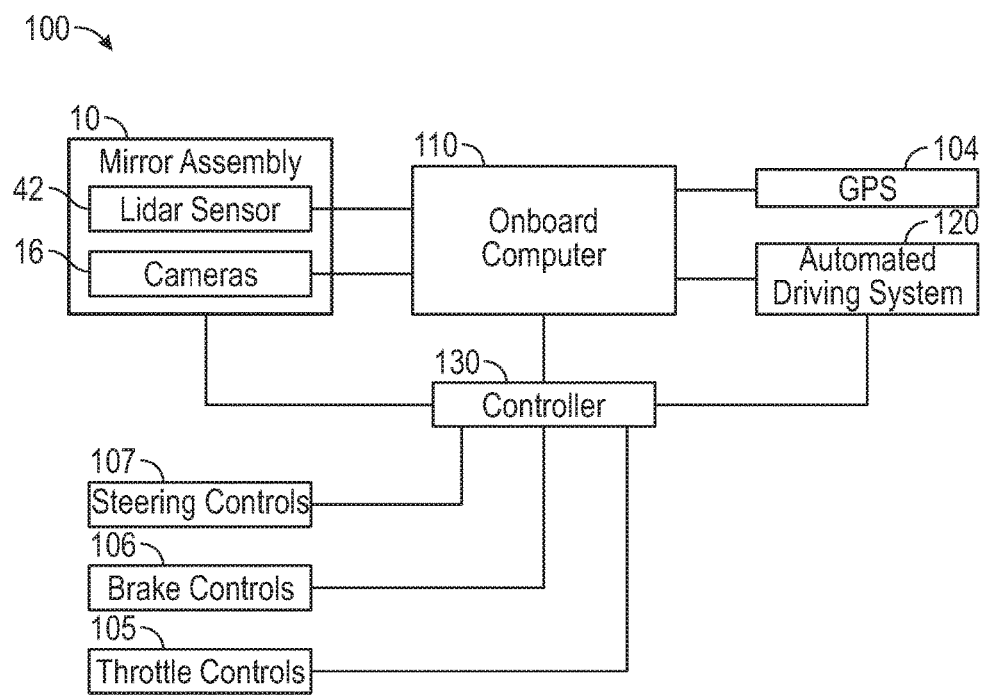
FIG. 1B illustrates a simplified block diagram of a vehicle outfitted with a modular mirror assembly according to examples of the disclosure.

FIG. 1A illustrates a vehicle 100 outfitted with a modular mirror assembly 10 according to examples of the disclosure, and FIG. 1B illustrates a simplified block diagram of the same. In some examples, vehicle 100 can include a side mirror assembly 10 on the driver's side as shown, and an additional side mirror assembly 10 (not shown) on the passenger's side. In some examples, vehicle 100 can include controls for steering (e.g., a steering wheel) 107 and controls to brake 106 and throttle 105. Some vehicles can include an automated driving system 120, which can control (or assist a driver in controlling) the steering 107, brake 106, and throttle 105 of the vehicle. In some examples, vehicle can further include optical sensors 42, such as Lidar sensors, which can be situated on or around the mirror assembly 10. Sensors 42 can assist the automated driving system by transmitting information regarding the surroundings of the vehicle to the automated driving system. Sensors that may be included on the vehicle are side sensors (which can be located at the driver and passenger side mirror locations), front sensors, rear sensors, and top-mounted sensors. In addition, vehicle 100 can include a global positioning system (GPS) 104, shown in FIG. 1B.

As shown in FIG. 1B, Lidar sensors 42, GPS 104, and cameras 16 can be connected to an onboard computer 110. Onboard computer 110 can control, via controller 130, the mirror assembly 10 using, for example, one or more motor assemblies (not shown). Onboard computer 110 may be further configured to receive, via controller 130, signals from the steering 107, brake 106, and throttle 105 controls. Further, onboard computer may be further configured to transmit and receive signals from the automated driving system 120.

Figure 2A:
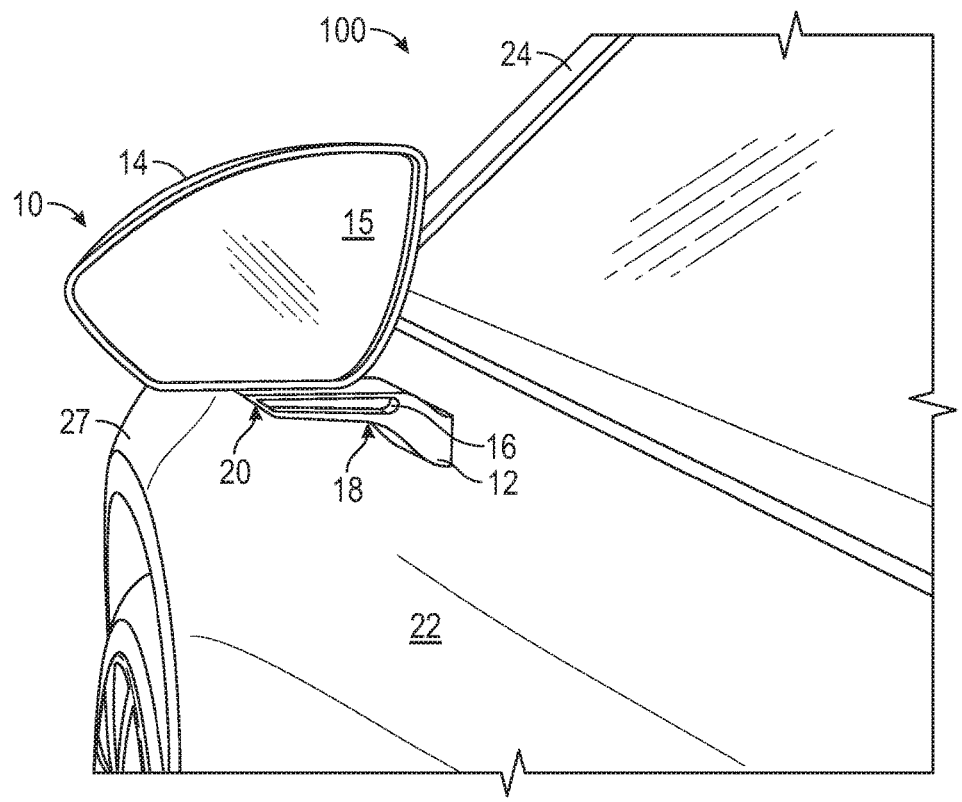
FIGS. 2A-2B show a modular mirror head attached to a mirror base.
Figure 2B:
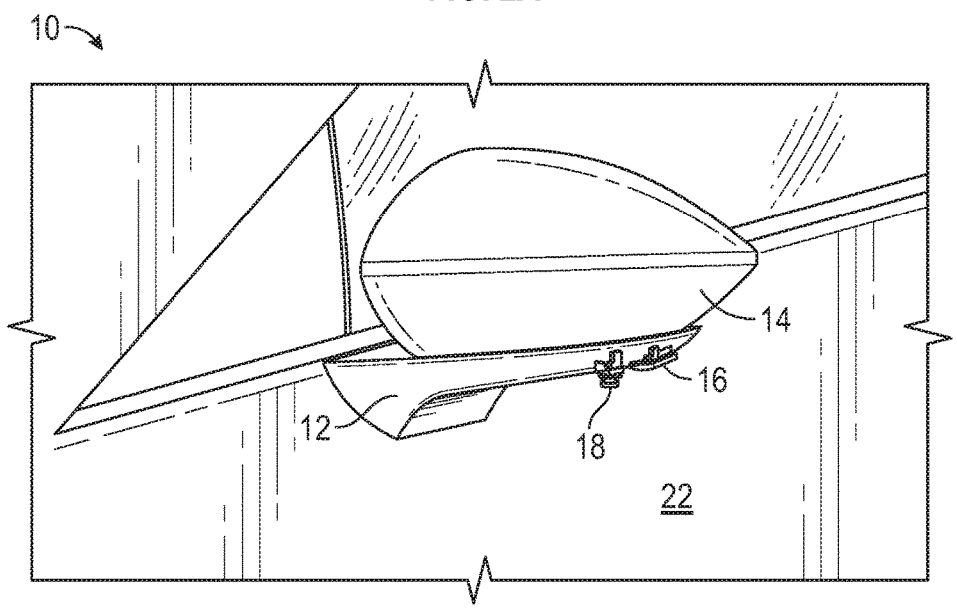

Referring to FIGS. 2A-2B a modular mirror assembly 10 is shown. In the driving position, the mirror head is fully extended. In these diagrams, mirror base 12 attaches a side view mirror head 14 to the driver side door 22 of vehicle 100. The mirror head 14 can include a mirror face. In some instances, mirror face can be a reflective surface 15. A similar mirror assembly can be supplied on the passenger side of the vehicle. In some configurations, mirror assembly 10 and/or mirror base 12 can include one or more cameras or camera assemblies that capture images (e.g., still images and/or video images) of the vehicle's surroundings for display to a driver. The cameras can be configured to capture images in any direction of interest. Cameras that may be included on the vehicle are a rearward facing camera 16, downward facing camera 18, a sideward facing camera 20, a forward-facing camera, and/or a periphery camera that provides a portion of a 360-degree view of the vehicle's surroundings. The rearward facing camera 16 shown can emulate the perspective provided by a typical side view mirror. The periphery camera images the area on the driver side of the vehicle. Images from the periphery camera can be combined with images obtained from a similar camera located on the passenger side mirror assembly to give the driver or other vehicle occupant a 360-degree view (or near 360-degree view) of the vehicle's surroundings. Images from the downward facing camera 18 can assist a user in viewing the curb when parallel parking and also can be used in a guidance system that warns a driver when the vehicle is drifting out of a driving lane. Images or videos captured by the camera(s) can be transmitted to a user display, such as a screen or heads-up display. The camera(s) can be digital or analog.

With continued reference to FIGS. 2A-2B, the mirror base 12 can be attached to a vehicle door 22, an "A" pillar 24, a front quarter panel 27, or any other suitable location, which may vary depending on the vehicle type (e.g., motorcycle) or vehicle design (e.g., sports car).

Figure 3A:
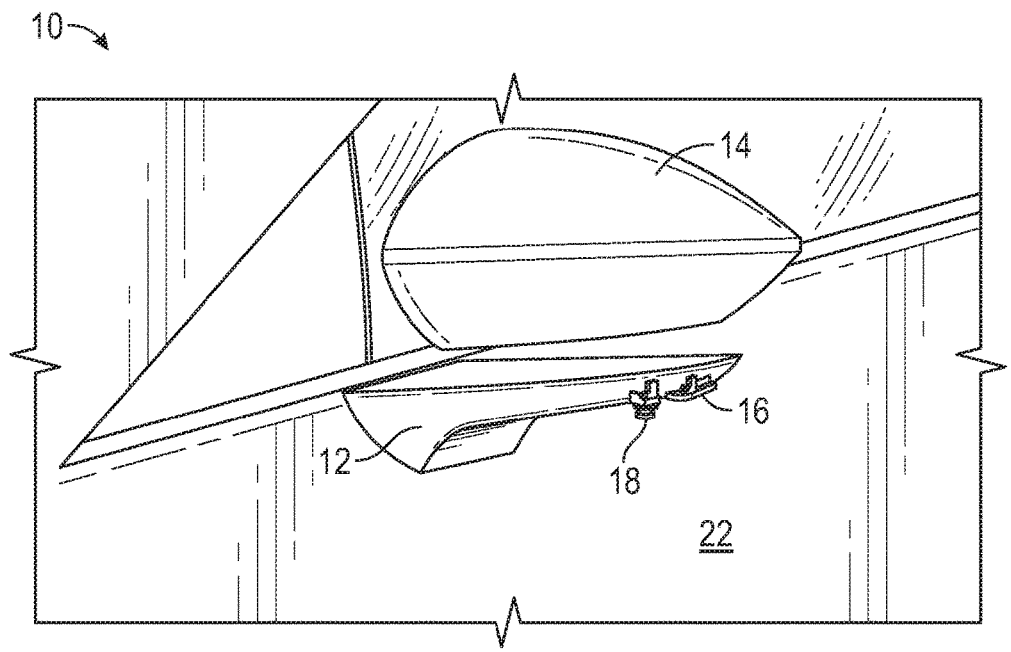
FIGS. 3A-3B show a modular mirror head removed from a mirror base.
Figure 3B:
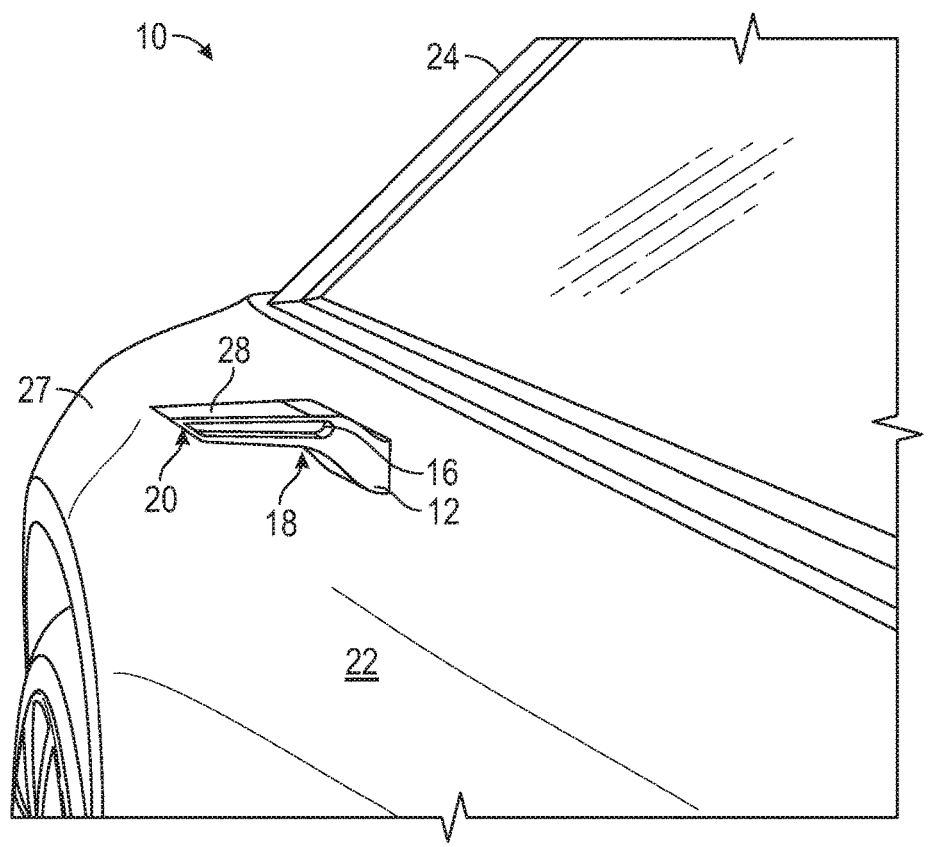

FIGS. 3A-3B show the same mirror assembly 10 as FIGS. 2A-2B with the modular side view mirror head removed, leaving the mirror base 12 and cameras 16, 18 fully functional and attached to the vehicle door 22. The powerfold motor assembly (not shown) is located inside the door 22.

In some examples, modular side view mirror head 14 can be removably coupled to the mirror base 12. For example, mirror base 12 can include a magnetic component (not shown) that is configured to secure mirror head 14 to the mirror base using a corresponding magnetic component (not shown) in the mirror head. In other configurations, a single magnetic component may be used, for example when the corresponding mirror head 14 or mirror base 12 is made of a magnetic material. The magnetic component of the mirror base and/or mirror head can have any size, shape, and number of magnets as necessary to achieve magnetic attraction there between such that there is enough magnetic force to hold the mirror head 14 in place relative to the mirror base 12 when a connection is desired, but allow the mirror head 14 to be removed from the mirror base 12 if needed, for example, for repair or replacement, or separation from vehicle 100 during a collision. In some examples, the magnetic attraction can be achieved using electromagnetic force alone or in combination with the above mentioned solutions.

A removable cap 28 can be attached to the mirror base 12 to cover any openings or fasteners, such as electrical or mechanical connections, that are exposed when the mirror head 14 is detached from the mirror base 12. The removable cap 28 protects these electrical or mechanical connections and can also be stylized to enhance vehicle aesthetics. The mirror head can be configured to accept or store the removable cap when the cap is not in use, to prevent loss of or damage to the cap, and to facilitate delivery of the cap at the time of vehicle purchase without the need for third party involvement.

Figure 3C:
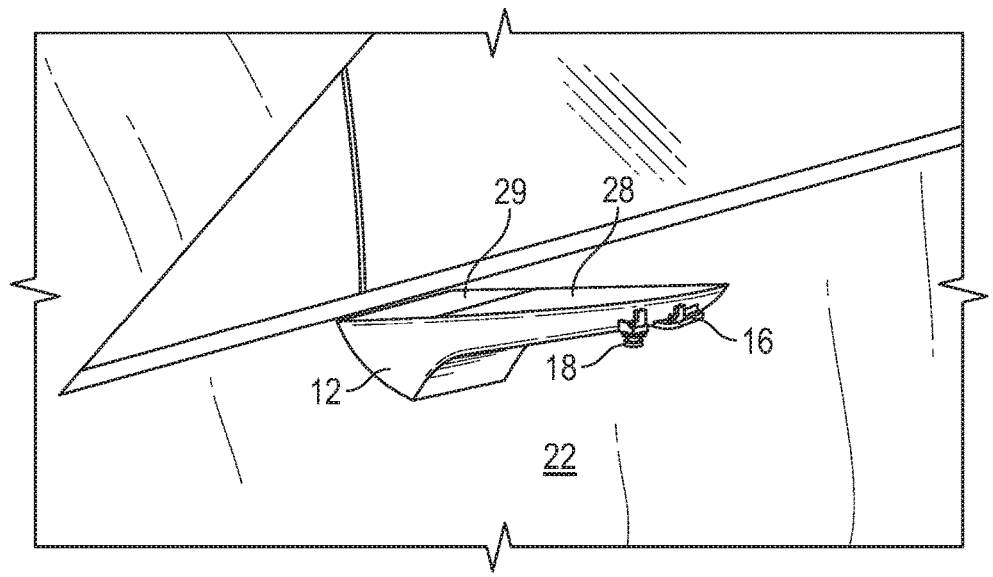
FIG. 3C is a diagram showing a mirror base including a removable cap that covers the attachment point of the mirror head.

Referring to FIG. 3C, the removable cap 28 can sit flush with the top surface 29 of the mirror base 12, which may also improve aerodynamics.

Figure 4A:
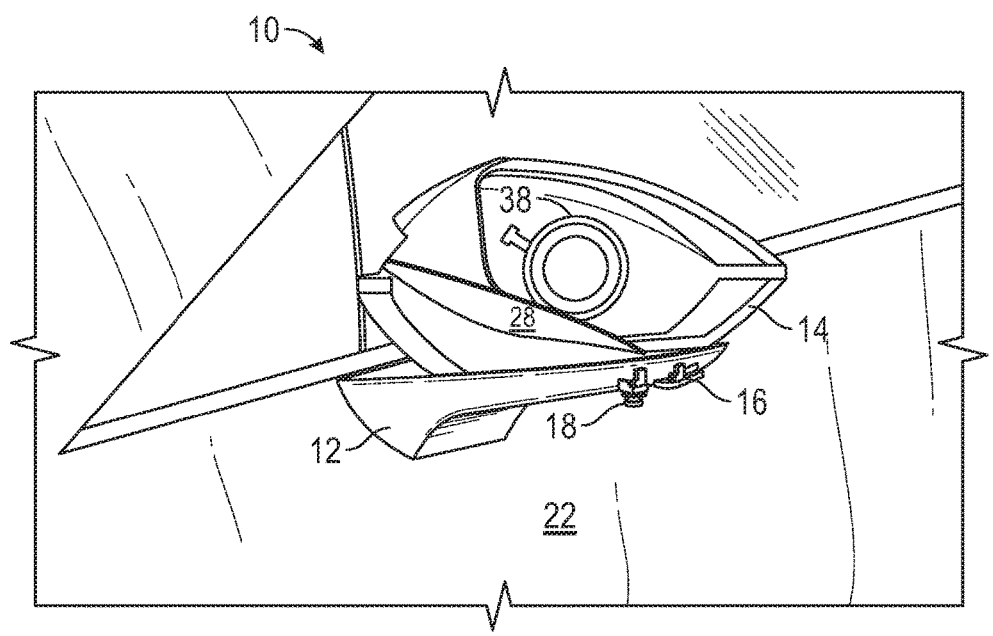
FIG. 4A is a diagram showing a removable cap secured inside a mirror head while the mirror head is attached to the mirror base.

FIG. 4A is a diagram showing a removable cap 28 secured inside a mirror head 14 while the mirror head 14 is attached to the mirror base 12. Preferably, the mirror head and removable cap are configured such that the cap does not interfere with attachment of the mirror head 14 to the mirror base 12 or operation of the mirror head 14. The mirror head can include an actuator 38 for mirror assembly 10, enabling the driver to adjust mirror positioning electronically from inside the vehicle.

Figure 4B:
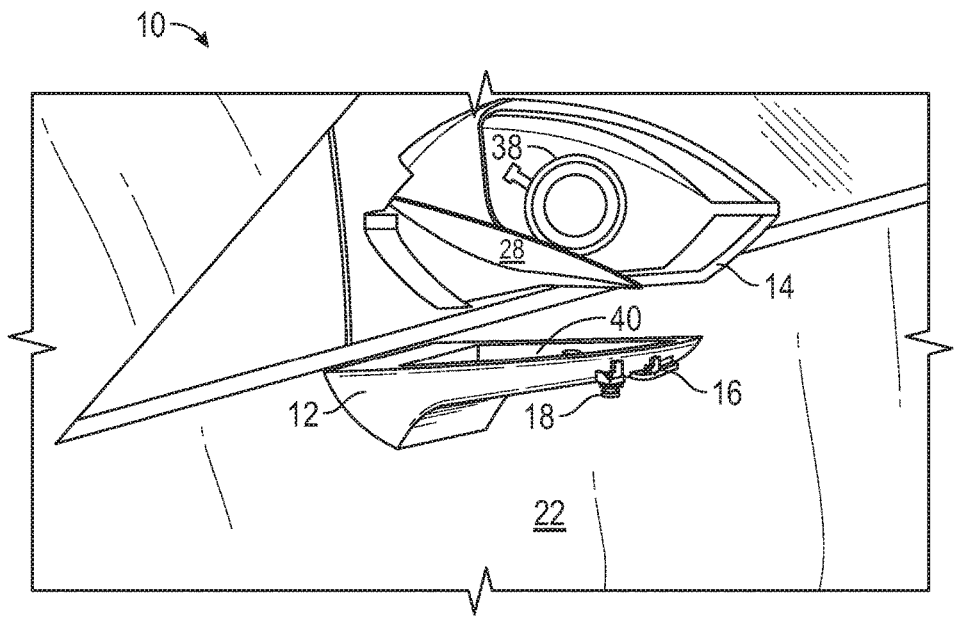
FIG. 4B is a diagram showing the mirror head detached from the mirror base.

FIG. 4B is a diagram showing the mirror head 14 detached from the mirror base 12, revealing an opening 40 in the mirror base. The removable cap 28 can be extracted from the mirror head 14 and placed over the opening 40.

Figure 5A:
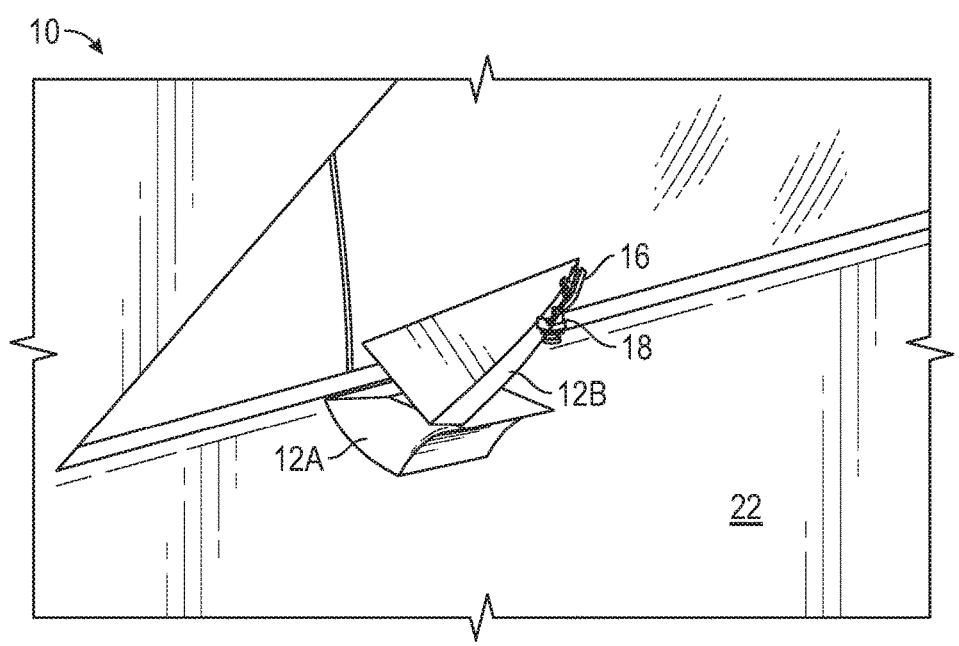
FIG. 5A shows a mirror base in a folded position against the vehicle door.

FIG. 5A shows a mirror base 12 comprising mirror base plate 12A and mirror base blade 12B. The figure illustrates the mirror base plate 12 in a folded position against the vehicle door 22. The mirror base blade 12B rotates relative to the mirror base plate 12A, which houses the powerfold motor assembly. Preferably, the mirror assembly is no wider than the overall width of the vehicle body when the mirror base blade 12B is powerfolded against the door. A significant advantage of folding mirror base blade 12B, with or without the modular head attached, is that camera(s) located on the mirror base blade 12B also move, which enables the driver to alter the viewing angle of the cameras simply by moving the mirror base blade 12B. Thus, the disclosure includes the ability for the driver or a passenger to selectively move the mirror based to provide additional viewing perspectives of the vehicle's surroundings.

Figure 5B:
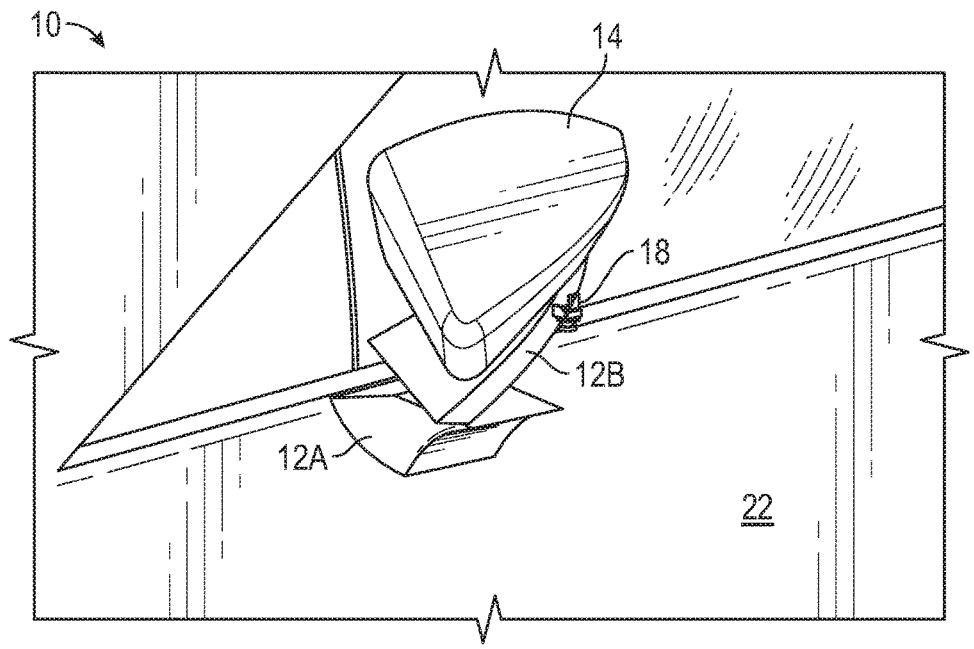
FIG. 5B shows a mirror head in a folded position against the vehicle door.

FIG. 5B shows a mirror head 14 in a folded position against the vehicle door 22. The mirror head 14 can be rotated inward toward the vehicle using a motor (motor assembly 36 in FIG. 8) when the vehicle is parked or turned off, to reduce the overall width of the vehicle and to reduce the likelihood of the mirror or mirror head being damaged by passing pedestrians, cyclists, or other vehicles.

Figure 6A:
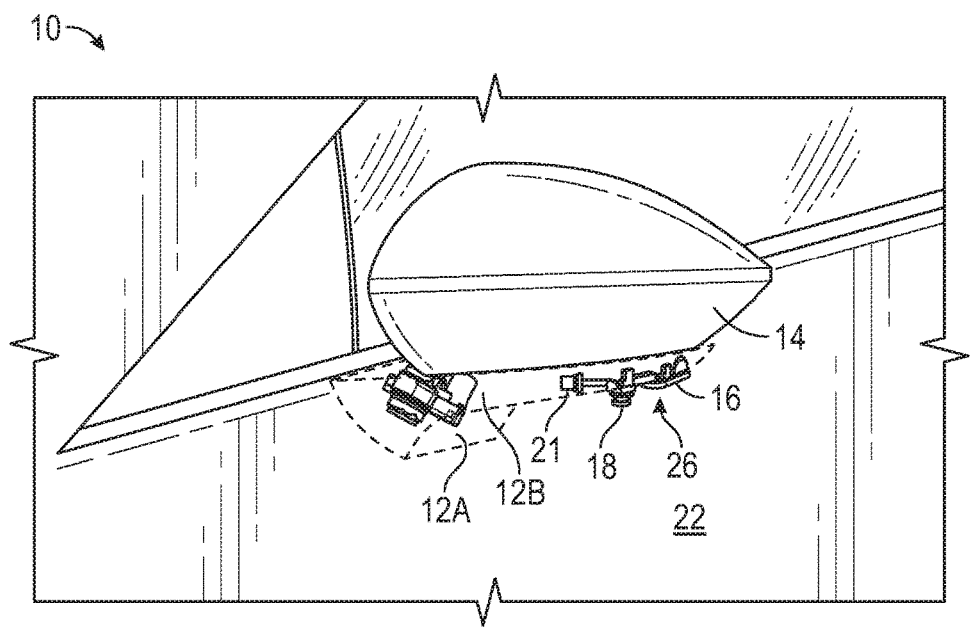
FIGS. 6A-6B show diagrams of the mirror base, revealing the motor assembly and components of the camera assembly.
Figure 6B:
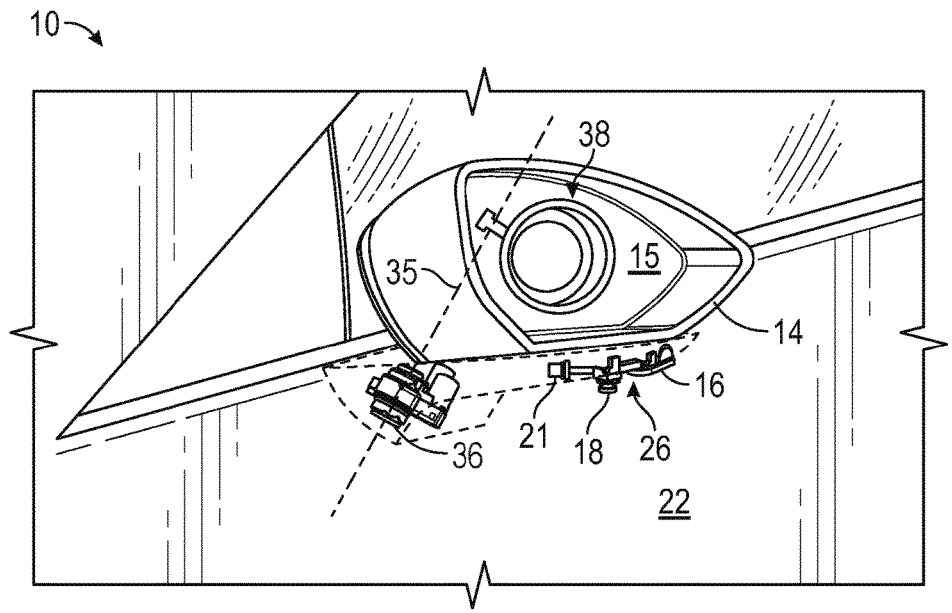

FIGS. 6A-6B show diagrams of the mirror base 12, revealing the motor assembly 36 and components of the camera assembly, such as a rearward facing camera 16, downward facing camera 18, and electrical connector 21 for the camera assembly 26. In some instances, the mirror base is dividing into two or more segments that move relative to one another when the powerfold motor is actuated. Mirror base plate 12A contacts the door 22 and secures the mirror assembly to the door 22. Mirror base blade 12B supports the modular mirror head 14 and is rotably connected to the mirror base plate 12A, allowing the mirror base blade 12B and mirror head 14 to pivot relative to the mirror base plate 12A.

Referring to FIGS. 4A-4B, additional features of the mirror assembly can be included. The mirror head 14 can include an actuator 38 for mirror assembly 10, enabling the driver to adjust the position of the mirror electronically from inside the vehicle.

Figure 7A:
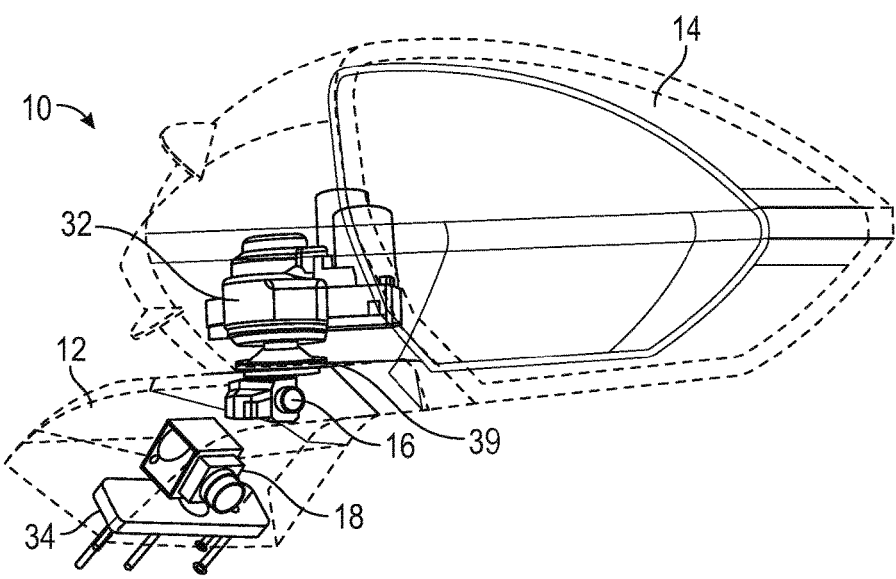
FIG. 7A shows a detailed diagram of a modular mirror head and mirror base assembly.

FIG. 7A shows a detailed diagram of a modular mirror head 14 and mirror base assembly 30. The mirror head 14 can include a motor assembly 32 for moving the mirror head 14 relative to the mirror base 12. For example, the mirror head 14 can be rotated inward toward the vehicle door 22 using motor assembly 32 when, for example, the vehicle is parked or turned off, to reduce the overall width of the vehicle and to reduce the likelihood of the mirror or mirror head being damaged by passing pedestrians, cyclists, or other vehicles. The mirror head 14 securely attaches to the mirror base 12 by means of a detachable connector 39. The mirror base includes an attachment point 34 configured to attach the mirror base 12 to a suitable location on the vehicle.

In some examples, attachment point 34 can comprise shear pins that are configured to achieve the coupling between mirror base 12 and mirror head 14. In these examples, the shear pins making up the attachment point 34 can be configured to break away when mirror head 14 is removed or separated from mirror base 12. Shear pins can have a variety of shapes and sizes, as long as the shear pins are long enough to reinforce the connection between the mirror base 12 and mirror head 14, but short enough to break away when mirror head 14 needs to be removed from the mirror base 12.

Figure 7B:
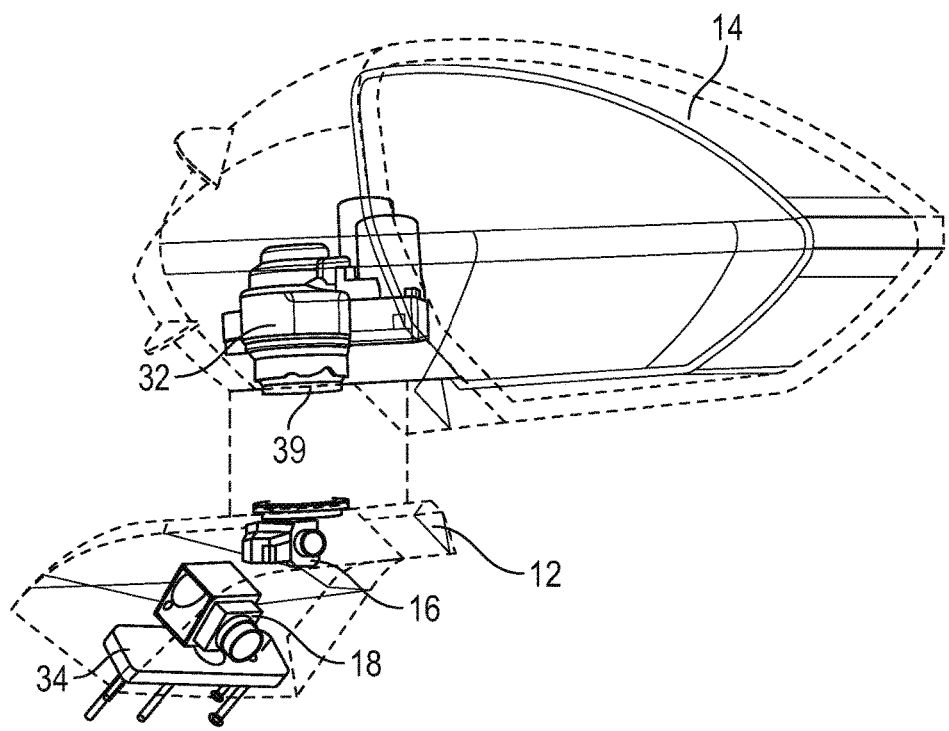
FIG. 7B shows the modular mirror head separated from its counterpart mirror base.

FIG. 7B shows the modular mirror head 14 separated from its counterpart mirror base 12.

Figure 8:
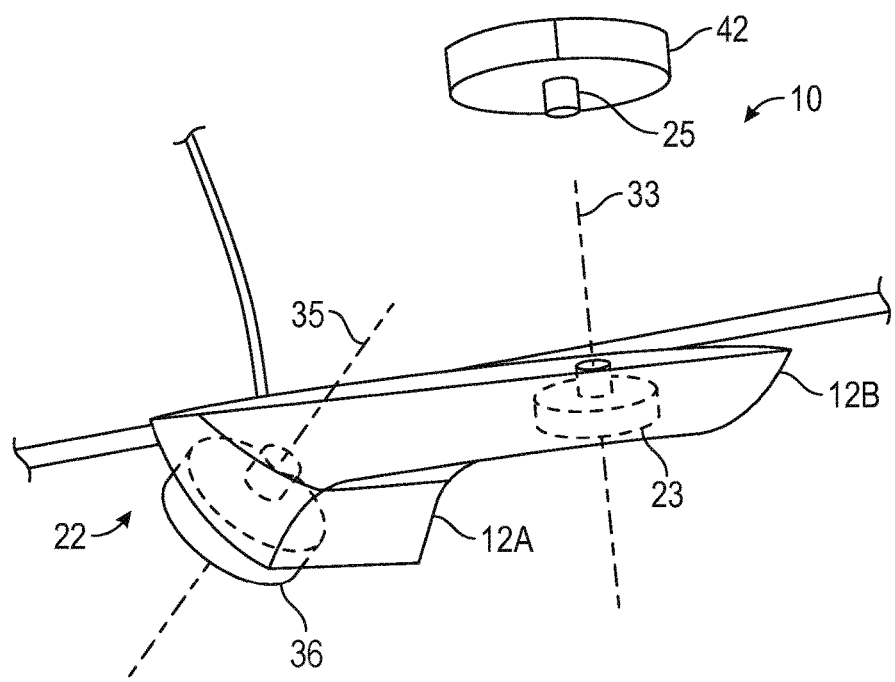
FIG. 8 illustrates a simplified diagram of additional features within the mirror assembly.

FIG. 8 illustrates a simplified diagram of additional features within the mirror assembly. The mirror assembly is shown in dashed lines to better illustrate the additional features within, and Lidar sensor 42 is shown detached from mirror base 12 for ease of explanation. In some examples, a motor assembly 36 can be included in the mirror base plate 12A. In other configurations, motor assembly 36 can be partially or fully included in the body 22 (e.g., door) of the vehicle. Locating the motor assembly in the mirror base plate and/or door can permit more compact shapes for mirror base blade 12B and can reduce strain on the mirror base plate 12A, thereby requiring less structural reinforcement, more design freedom, and more cost-effective manufacturing. The mirror base plate 12A can rotate about the rotational axis 35 of the motor assembly 36 as discussed with reference to FIG. 6B above. In some configurations, mirror assembly 10 can include a secondary motor assembly 23 located in the mirror base blade 12B. Secondary motor assembly 23 can be configured to rotate sensor 42 about the secondary axis of rotation 33, which can coincide with the cylindrical axis of the Lidar sensor.

In some configurations, secondary motor assembly 23 can be connected to the Lidar sensor 42 (as shown in FIG. 8) via a mechanical connector 25. When Lidar sensor 42 is attached to the mirror base assembly, the connector (connector 21 in FIGS. 6A-6B) can extend from the Lidar sensor 42 through the upper surface of the mirror base blade 12B. In this way, the rotational movement of the secondary motor assembly 23 can be translated to the sensor 42. In some configurations, sensor 42 can be attached to the mirror base assembly via the connector, though the sensor may be attached to the mirror base assembly at additional locations.

In examples (not shown) where two or more sensors are attached to the mirror base 12, a first sensor may be attached to the mirror base at an upper surface of the mirror base blade 12B, while a second sensor may be attached to the mirror base at a lower surface of the mirror base blade 12B. In these configurations, the two sensors may share the same axis of rotation (e.g., secondary axis of rotation 33), and the second sensor may be connected to the same motor assembly as the first sensor (e.g., connected to secondary motor assembly 23). Further, the second sensor can be connected to the motor assembly via a connector (connector 21 in FIGS. 6A-6B). Thus, in these configurations, both the first and second sensor can move in unison about the same axis of rotation.

FIGS. 9A-9D illustrate a modular mirror assembly in various configurations, which can be installed on a vehicle. For clarity, the modular mirror assembly is shown as isolated without the vehicle, however, it should be understood that the modular mirror system described herein can be mounted at any location on the vehicle which is convenient to provide the user of the vehicle with views of the surrounding area of the car.

Figure 9A:
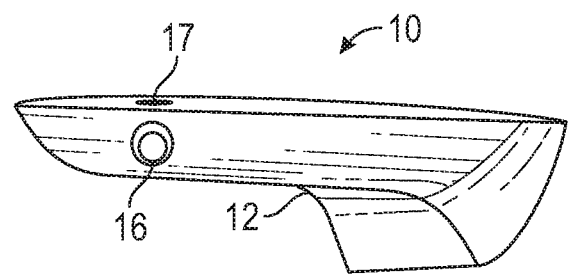
FIG. 9A shows an example mirror base, which can be installed on a vehicle, according to examples of this disclosure.

FIG. 9A illustrates a mirror base 12, which can be included in the modular mirror assembly 10. Mirror base 12 can be attached to a vehicle door, an "A" pillar, a front quarter panel, or any other suitable location, which may vary depending on the vehicle type (e.g., motorcycle) or vehicle design (e.g., sports car). In some configurations, mirror base 12 can include one or more cameras or camera assemblies that capture images (e.g., still images and/or video images) of the vehicle's surroundings for display to a driver. For example, the mirror base 12 can include a rearward facing camera 16. In some examples, mirror base 12 can include an attachment point 17 (obscured in FIGS. 9B-9D), which can be covered by a removable cap.

Figure 9B:
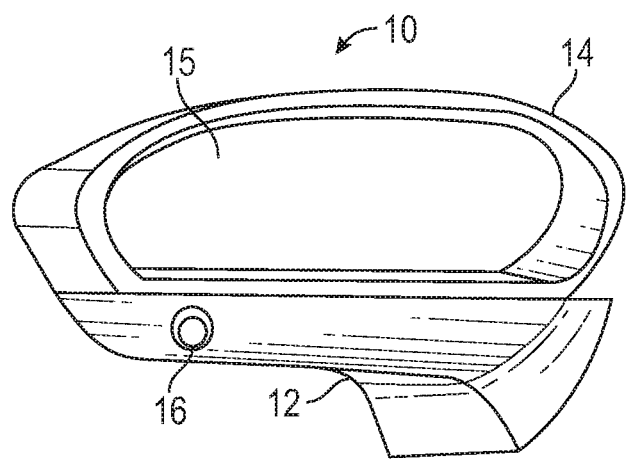
FIG. 9B shows the mirror base of FIG. 9A with a modular mirror head attached to the mirror base according to examples of this disclosure.

Referring to FIG. 9B, a modular mirror assembly 10 is shown with a mirror head 14. Mirror head 14 can further include a mirror face 15. Mirror assembly 10 can be attached via at least the attachment point 17. In some configurations, one or more motor assemblies (not shown) can be inside the door 22 and/or mirror base 12. These motor assemblies can be used to move the mirror head 14 and/or the mirror face 15.

Figure 9C:
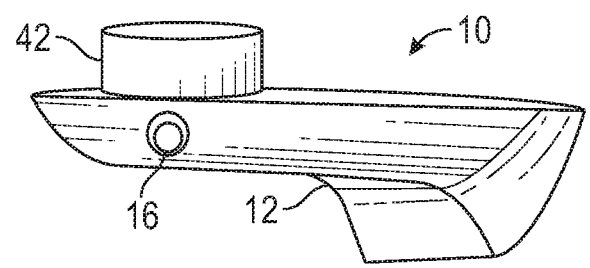
FIG. 9C shows the mirror base of FIG. 9A with a Lidar sensor attached to the mirror base according to examples of this disclosure.

FIG. 9C illustrates the same mirror assembly 10 without a mirror head assembly attached, but with a Lidar sensor 42 attached to the mirror base 12. Lidar sensor 42 can be attached via an attachment point (attachment point 17 illustrated in FIG. 9A). In some cases, Lidar sensor 42 may have a limited field of view. For example, the sensor 42 shown in FIG. 9C may have only forward-facing visibility (i.e., 180-degree field of view), though it should be understood that in all examples described herein, a Lidar sensor can be used which has 360-degree or near 360-degree field of view. Still referring to FIG. 9C, a motor assembly (not shown) can be located inside the door and/or mirror base 12. As will be discussed in more detail below, in some configurations, the motor assembly can move the Lidar sensor 42 in order to dynamically adjust the field of view of the sensor according to speed and/or direction of the vehicle.

Figure 9D:
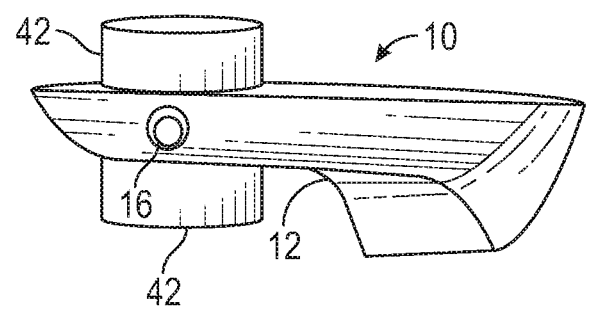
FIG. 9D shows the mirror base of FIG. 9A with two Lidar sensors attached to the mirror base according to examples of this disclosure.

FIG. 9D illustrates the same mirror assembly 10 as in FIG. 9C, but with an additional Lidar sensor 42 attached to the underside of the mirror base 12. As will be discussed, both Lidar sensors can be configured to move in order to dynamically adjust the field of view of the sensors according to the speed and/or direction of the vehicle.

Figure 10A:
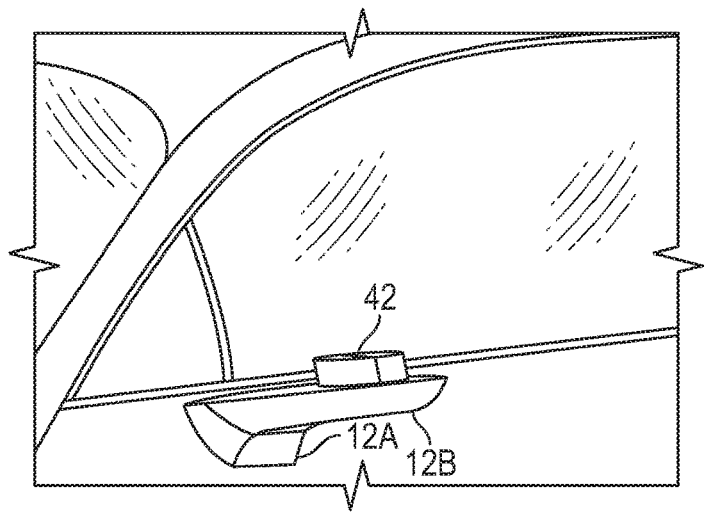
FIGS. 10A-10C show a detailed view of an example movement of a modular mirror assembly with two Lidar sensors attached according to examples of this disclosure.
Figure 10B:
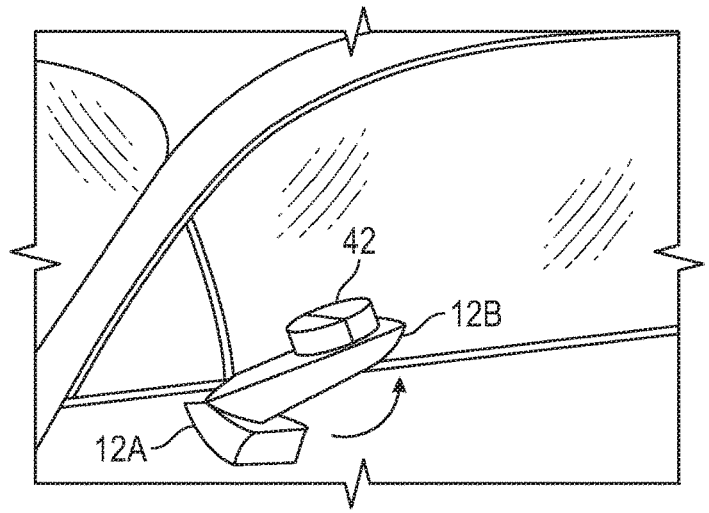
Figure 10C:
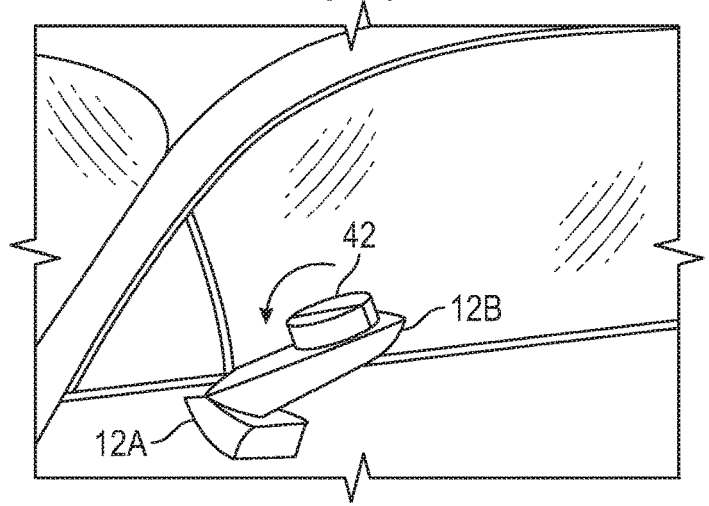

FIGS. 10A-10C show a detailed view of an example movement of a modular mirror assembly with a Lidar sensor 42 attached (e.g., the configuration shown in FIG. 9C). The shaded area of sensor 42 can represent the area at which the field of view extends through the sensor. FIGS. 10A-10B illustrate movement of the mirror base 12, while FIG. 10C illustrates movement of the Lidar sensor independent of the movement of the mirror base. As shown, in some configurations, the mirror base 12 can be divided into two segments mirror base plate 12A and mirror base blade 12B, which can move relative to one another when a motor assembly (not shown) is actuated. Mirror base plate 12A can contact a door (door 22 in FIG. 2A) and secure the mirror assembly to the door. Mirror base blade 12B can support the sensor 42 (or the mirror head) and is rotably connected to the mirror base plate 12A, allowing the mirror base blade 12B and sensor 42 to pivot relative to the mirror base plate 12A. In a first position, shown in FIG. 10A, the mirror base blade 12B can be positioned such that sensor is situated at a first angle relative to the vehicle chassis. At a second position, shown in FIG. 10B, mirror base blade 12B can be positioned such that sensor 42 is situated at a second angle, larger than the first angle, with respect to the vehicle chassis. Although only two positions are shown in FIGS. 10A-10B for simplicity, it should be understood that the mirror base can be configured to situate the sensor at any position according to the geometries of the mirror base and sensor as indicated by the arrow in FIG. 10B.

In some configurations, such as when Lidar sensor 42 has a limited radial field of view, it can be beneficial to move Lidar sensor 42 independent of the movement of mirror base 12. FIG. 10C illustrates such an example configuration where mirror base blade 12B is in the same position as shown in FIG. 10B, but the Lidar sensor 42 is a different position from that shown in FIG. 10B. In the configuration shown in FIG. 10C, Lidar sensor 42 may be configured to rotate about an axis extending from an attachment point (attachment point 17 in FIG. 9A) through the sensor. The position of sensor 42 shown is exemplary only, as the sensor 42 can be configured to rotate at any angle as indicated by the arrow shown. The sensor 42 can be rotated via a second motor assembly (not shown).

Figure 11A:
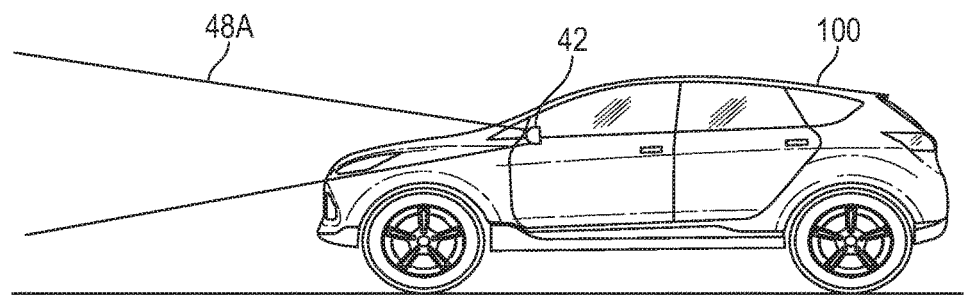
FIGS. 11A-11F show example fields of view of the Lidar sensors of FIGS. 3A-3C according to examples of this disclosure.
Figure 11B:
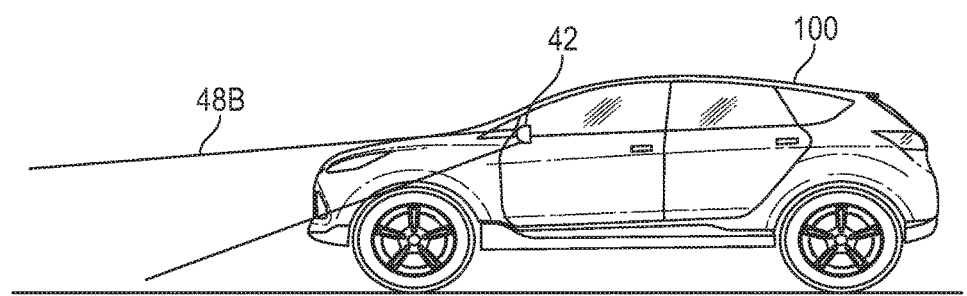
Figure 11C:
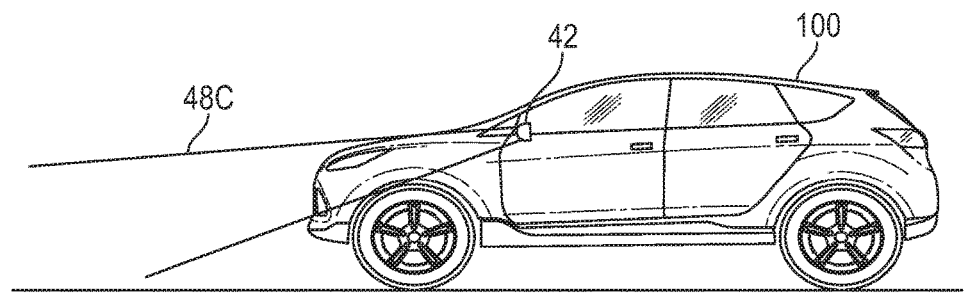
Figure 11F:
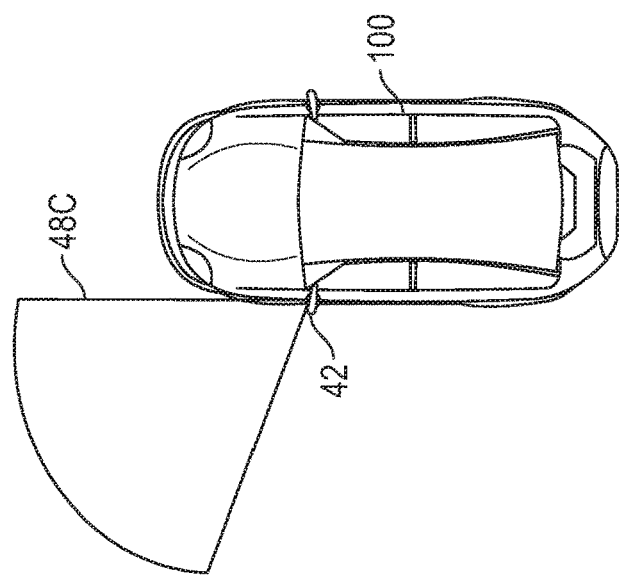
Figure 11E:
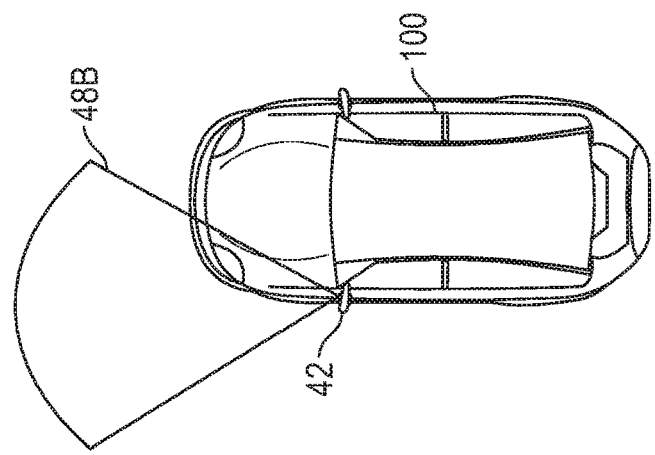
Figure 11D:
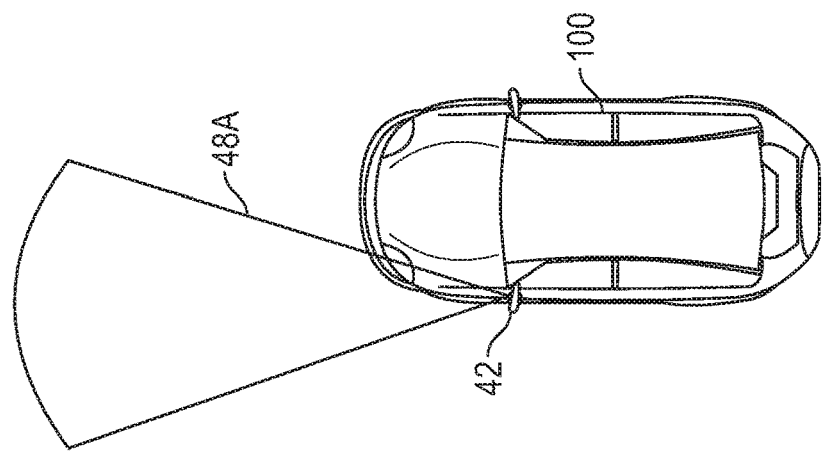

FIGS. 11A-11D illustrates a side view of a vehicle 100 including example vertical fields of view of the Lidar sensor 42 corresponding to the configurations of the Lidar sensors of FIGS. 10A-10C, respectively. FIGS. 11D-11F illustrate horizontal fields of view of the Lidar sensor 42 corresponding to the configurations of the Lidar sensors of FIGS. 11A-11C, respectively. For clarity, the fields of view of other Lidar sensors which may be on the vehicle are not shown. As shown in FIGS. 11A-11C, when Lidar sensor is in a first position (i.e., that shown in FIG. 10A), the field of view 48A can project at a further distance from the vehicle in the direction of travel. Conversely, when sensor 42 is at a second position (i.e., that shown in FIG. 10B), the field of view 48B can project at a shorter distance from the vehicle in the direction of travel. In some configurations, the angle of the mirror base 12, and thus, the field of view 48, can be varied according to the speed of the vehicle. For example, when driving at higher speeds, the field of view 48A can project further, thus, anticipating approaching objects with adequate time for the user and/or automated driving system to react. Conversely, when driving at slower speeds, the field of view 48B can be projected at a shorter distance, thus, providing more detailed information to the automated driving system about the immediate surroundings of the vehicle. This can be beneficial, for example, in situations where the vehicle is moving through areas crowded with pedestrians, vehicles, or other objects.

Though not illustrated here, in some configurations the mirror head assembly can be attached to mirror base 12 via a connector (connector 21 in FIGS. 6A-6B) connected to Lidar sensor 42. Referring to FIGS. 8 and 9B, when a mirror head assembly is attached to mirror base 12, the mirror head assembly can include a mirror face 15. In some cases, mirror face 15 can be configured to move independent of the mirror head 14. In these configurations, as in the previous example, connector can also be configured to connect to the secondary motor assembly 23 such that the mirror head 14 (or some portion of it) can rotate about the secondary axis of rotation 33 via the connector. For example, only the mirror face 15 may rotate about the secondary axis of rotation 33 using, for example, additional mechanical assemblies within the mirror head.

FIG. 11C illustrates the vertical view of the Lidar sensor 42 when in the configuration shown in FIG. 10C, that is, when the mirror base 12 is in the same position as shown in FIG. 10B, but sensor 42 has rotated. Because the position of mirror base 12 is the same as in FIG. 10B, the vertical field of view 48C can substantially match that of field of view 48B.

As illustrated in FIG. 11D-11F, sensor field of view can be configured to move horizontally, thereby directing the field of view of the sensors more rightward or leftward. This could be beneficial, for example, in cases where sensor 42 has a limited field of view in the horizontal direction. As discussed, the field of view 48A can project at a further distance from the vehicle in the direction of travel than the field of view 48B. For example, as shown, if the vehicle is driving at higher speeds (e.g., along a straight stretch of road), the field of view 48A can project further. Conversely, when driving at slower speeds (e.g., approaching a sharp curve), the field of view 48B can be projected at a shorter distance, thus, providing more detailed information to the automated driving system about the immediate surroundings of the vehicle. As illustrated, in some configurations, the field of view 48C can be steered in the horizontal direction (i.e., in the state shown in FIG. 11C) when turning or approaching a turn. In some examples, the horizontal movement of the field of view 48C can be determined based on the steering angle of the steering wheel. In addition, in some examples, the field of view of sensor 42 can be adjusted in a left or right direction in order to correct any shift in horizontal field of view from the rotation of the mirror assembly as described above.

The use of sections is not meant to limit the disclosure; each section can apply to any aspect, embodiment, or feature of the disclosure.

Where devices are described as having, including, or comprising specific components, or where processes are described as having, including or comprising specific process steps, it is contemplated that devices of the disclosure also consist essentially of, or consist of, the recited components, and that the processes of the disclosure also consist essentially of, or consist of, the recited process steps.

The use of the terms "include," "includes," "including," "have," "has," or "having" should be generally understood as open-ended and non-limiting unless specifically stated otherwise. The use of the singular herein includes the plural (and vice versa) unless specifically stated otherwise. Moreover, the singular forms "a," "an," and "the" include plural forms unless the context clearly dictates otherwise.

The term "about" before a quantitative value includes the specific quantitative value itself, unless specifically stated otherwise. As used herein, the term "about" refers to a ±10% variation from the quantitative value.

It should be understood that the order of steps or order for performing certain actions is immaterial so long as the disclosure remains operable. Moreover, two or more steps or actions may be conducted simultaneously.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The invention claimed is:

1. A vehicle sensor assembly comprising:
    an optical sensor;
    a first motor assembly
    a second motor assembly; and
    a base, including:
        a first base section and a second base section;
    wherein:
        the first base section is attached to the vehicle,
        the second base section is rotatably attached to the first base section via the first motor assembly,
        the optical sensor is rotatably attached to the second base section via the second motor assembly; and
    wherein the first motor assembly is configured to move the second base section to a position relative to the first base section based on a speed of the vehicle, and the second motor assembly is configured to rotate the optical sensor based on a steering angle of the vehicle.

2. The vehicle sensor assembly of claim 1, wherein:
    the first motor assembly is configured to rotate the first base section about a first axis, and
    the second motor assembly is configured to rotate the optical sensor about a second axis.

3. The vehicle sensor assembly of claim 2, wherein the second motor assembly is configured to rotate the optical sensor based on a detected path of the vehicle.

4. The vehicle sensor assembly of claim 2, wherein the first axis is perpendicular to the second axis.

5. The vehicle sensor assembly of claim 2, wherein:
    the second base section includes a top side facing upwards with respect to an orientation of the vehicle, and a bottom side facing downwards with respect to the orientation of the vehicle;
    the second base section is attached to the optical sensor at the top location of the second base section, and
    the second base section is attached to the second optical sensor at the bottom location.

* * * * *